United States Patent
Yu et al.

(10) Patent No.: US 9,150,769 B2
(45) Date of Patent: Oct. 6, 2015

(54) PHASE-CHANGING MATERIAL MICROCAPSULES BY USING PMMA PREPOLYMER AND ORGANIC-SOLVENT FREE SYNTHESIS PROCESS

(75) Inventors: Yi-Hsiuan Yu, Taoyuan County (TW); Ping-Szu Tsai, Kaohsiung (TW); Tsung-Hsien Tsai, Kaohsiung (TW); Bao-Yann Lin, Hsinchu County (TW); Ming-Hsiung Wei, Taoyuan County (TW)

(73) Assignee: National Chung-Shan Institute of Science and Technology, Taoyuan County (TW)

( * ) Notice: Subject to any disclaimer, the term of this patent is extended or adjusted under 35 U.S.C. 154(b) by 413 days.

(21) Appl. No.: 13/442,126

(22) Filed: Apr. 9, 2012

(65) Prior Publication Data
US 2013/0264513 A1 Oct. 10, 2013

(51) Int. Cl.
| | |
|---|---|
| *A61Q 17/04* | (2006.01) |
| *A61K 36/00* | (2006.01) |
| *C09K 5/02* | (2006.01) |
| *C09K 5/06* | (2006.01) |
| *C08F 220/14* | (2006.01) |
| *C08F 22/10* | (2006.01) |

(52) U.S. Cl.
CPC ............... *C09K 5/02* (2013.01); *C08F 220/14* (2013.01); *C09K 5/063* (2013.01); *C08F 22/105* (2013.01)

(58) Field of Classification Search
USPC ............... 252/68; 428/402–402.24, 403, 404, 428/407, 321.1, 474.4; 427/331, 389.9, 427/212, 213–213.36, 483, 256; 424/400, 424/408, 450, 451, 455, 93.7, 184.1, 497, 424/489, 501, 490, 491, 492, 493, 494, 495
See application file for complete search history.

(56) References Cited

U.S. PATENT DOCUMENTS

2002/0050659 A1 * 5/2002 Toreki et al. ................... 264/4.1

OTHER PUBLICATIONS

Chang et al. (J. Applied Pol. Sci., 112, 1850-1857).*
Alkan et al. (Energy Conversion and Management 52, 2011, 687-692).*

(Continued)

*Primary Examiner* — James J Seidleck
*Assistant Examiner* — S. Camilla Pourbohloul
(74) *Attorney, Agent, or Firm* — Jackson IPG PLLC; Demian K. Jackson

(57) ABSTRACT

Phase change material microcapsules are obtained using a PMMA prepolymer and an organic-solvent free synthesis process. A polymer monomer and an initiator are subject to pre-polymerization in a water bath to form Polymethyl methacrylate (PMMA) prepolymer which is then prepared to be a stabilizer aqueous solution. A phase change material is added to the stabilizer aqueous solution and liquefied in advance, and stirred to form an emulsion by a homogenizing mixer. A starting agent, a cross-linking agent and a Polymethyl methacrylate methyl ester prepolymer are added to the emulsion containing the phase-change material. The emulsion is further stirred by the homogenizing mixer for micro-emulsification which then aggregates in water bath. In this way, the process may use organic-solvent free process to pre-polymerize the polymer monomer into a Polymethyl methacrylate prepolymer and carries out encapsulation and polymerization at an oil-water interface to achieve the preparation of phase change material microcapsules.

15 Claims, 3 Drawing Sheets

(56) References Cited

OTHER PUBLICATIONS

Zhang, Yan et al., Preparation and Thermal Property of Phase Change Material Microcapsules by Phase Separation, Materials Science Forum, Oct. 2, 2007, pp. 2293-2296, vols. 561-565, Trans Tech Publications, Switzerland.

Alkan, Cemil, et al., Preparation, thermal properties and thermal reliability of microencapsulated n-eicosane as novel phase change material for thermal energy storage, Energy Conversion and Management, Sep. 1, 2010, pp. 687-692, vol. 52, Elsevier Ltd.

Chang, Chih Chung, et al., Preparation of Phase Change Materials Microcapsules by Using PMMA Network-Silica Hybrid Shell Via Sol-Gel Process, Journal of Applied Polymer Science, Feb. 11, 2009, pp. 1850-1857, vol. 112, Wiley Periodicals, Inc.

Ma, Sude et al., UV irradiation-initiated MMA polymerization to prepare microcapsules containing phase change paraffin, Solar Energy Materials & Solar Cells, May 20, 2010, pp. 1643-1647, vol. 94, Elsevier B.V.

Park, B. J., et al., Preparation and Characterization of Poly(Methyl Methacrylate) Coated TiO2 Nanoparticles, Journal of Macromolecular Science, 2006, pp. 53-60, vol. 45 Part B: Physics, Taylor & Francis, LLC.

* cited by examiner

PHASE-CHANGING MATERIAL MICROCAPSULES BY USING PMMA PREPOLYMER AND ORGANIC-SOLVENT FREE SYNTHESIS PROCESS

BACKGROUND OF THE INVENTION

1. Field of the Invention

The present invention relates to phase change material microcapsules synthesized by using a PMMA prepolymer and an organic-solvent free process, and more particularly to phase change material microcapsules synthesized by an organic-solvent free process which enables a polymer monomer is subject to pre-polyerization to form Polymethyl methacrylate prepolymer and also to encapsulation and polymerization at an oil-water interface, thereby achieving the preparation of the phase change material microcapsules.

2. Description of Related Art

In general, phase change material has the ability to change its physical state at a certain temperature, and absorbs or releases a large amount of latent heat in phase changing process. One of the characteristics of phase change material is during the change of physical state, the temperature of the material itself remained almost unchanged in the completion of the phase changing process. The combination of the above features favors to a broader development of the phase change material in various applications such as food preservation and temperature regulation.

The phase change material has a good advantage in energy storage. However, if it is directly applied in the phase transition, material loss during the phase transition will greatly affect the life of the material.

A microcapsule is a core-shell technology which uses a trace material as a shell to encapsulate another materiaml Therefore, the use of microencapsulation technology can solve the above mentioned problems of material loss and volume change caused by physical changes. In addition, the particle size becomes very small and the specific surface area becomes larger after the microencapsulation providing a larger heat transfer area. After the microencapsulation, the capsulate wall is usually thin which renders the heat transfer greatly improved.

Preparation of Polymethyl methacrylate (PMMA) microcapsules has been proposed in a lot of relevant literatures. For example, Park et al disclosed in 2006 modified titanium dioxide ($TiO_2$) is encapsulated with Polymethyl methacrylate by using electrophoretic suspension process to form multi-core titanium dioxide microspheres. In 2007, Zhang et aml disclosed that with a phase separation method, Polymethyl methacrylate and PS are used to encapsulate tetradecane, and the obtained microcapsulates have uniform size and average particle size of 1-2 μm. In 2010, Ma et al, disclosed that the use of UV light to irradiate over a light initiator initiates the polymerization of methyl methacrylate (MMA) within an emulsion, obtaining phase-changing microcapsulates of good thermal stability. In 2011, Alkan et aml successfully encapsulate eicosane of particle size between 0.4-2.3 μm with Polymethyl methacrylate by using emulsion polymerization process, obtaining microcapsules of good thermal stability and chemical stability. In Taiwan, Zhang disclosed that methyl methacrylate and an initiator are subject to pre-polymerization in an organic solvent; the phase change material and the previously obtained prepolymer are added to an aqueous solution of polyvinyl alcohol (PVA); and then emulsification, homogeneous mixing, warming polymerization, filtering, washing, and drying are carried out to obtain microcapsules. Some approaches of preparation of phase change material microcapsules have been proposed in the industry, such as textiles Industry Research Institute disclosed a process to prepare phase-changing microencapsulated by using an acrylic monomer of bi-functional or tri-functional group.

Except Zhang's process that encapsulates the phase change material with the prepolymer at two steps, most of disclosures describe that methyl methacrylate monomer is directly subject to polymerization for encapsulating the phase change materiaml The approaches proposed by the Textile Research Institute and Zhang prepare the prepolymers in the environment containing organic solvents. The organic solvents in the manufacturing process are, eventually, directly discharged into the atmosphere, which has an adverse influence on the working environment.

For this reason, the inventors have made intensively efforts for years over the aforementioned problem and finally succeed to develop phase change material microcapsules synthesized by using a PMMA prepolymer and an organic-solvent free process, which overcomes the prior shortages.

SUMMARY OF THE INVENTION

The object of the present invention is to provide phase change material microcapsules synthesized by an organic-solvent free process which enables a polymer monomer is subject to pre-polymerization to form Polymethyl methacrylate prepolymer and also to encapsulation and polymerization at an oil-water interface, thereby achieving the preparation of the phase change material microcapsules.

The phase change material microcapsules synthesized by using a PMMA pre-polymer and an organic-solvent free process are prepared by at least the following steps:

Step 1: a polymer monomer and an initiator are subject to pre-polymerization in water bath so as to form Polymethyl methacrylate (PMMA) prepolymers;

Step 2: a stablizer aqueous solution is prepared, and a phase change material is added to stabilizer aqueous solution over phase change temperature for liquefaction then stirred by a homogenizing mixer to become emulsion; and Step 3: an initiator, a cross-linking agent and the Polymethyl methacrylate prepolymer are added to the emulsion containing the phase change material, and the emulsion is further stirred for 3 minutes by a homogenizing mixer for micro-emulsion and followed by subject to polymerization in water bath.

In one embodiment of the invention, the polymer monomer at Step 1 is methyl methacrylate (MMA).

In one embodiment of the invention, at Step 1 the amount of the initiator based on the polymer monomer is 0.1 wt %.

In one embodiment of the invention, the initiator at Step 1 is benzoyl peroxide (BPO), or 2,2-azobisisobutyronitrile (AIBN).

In one embodiment of the invention, the Polymethyl methacrylate prepolymer is prepared in an organic-solvent free environment.

In one embodiment of the invention, the Polymethyl methacrylate prepolymer is prepared at 60° C. to 90° C., and preferably 80° C.

In one embodiment of the invention, the time period of for preparation of the Polymethyl methacrylate prepolymer is 5 minutes to 90 minutes, and preferably 20 minutes to 50 minutes.

In one embodiment of the invention, the concentration of the stabilizer in water is between 0.01 to 1%, and preferably 0.1%.

In one embodiment of the invention, the stabilizer is selected from one of polyvinyl alcohol (PVA), polyvinyl pyrrolidone (PVP), polyethylene glycol (PEG), and surfactants such as TWEEN or SPAN.

In one embodiment of the invention, the phase change material is organic paraffin having 14~44 carbons.

In one embodiment of the invention, at Step 2 the stabilizer aqueous solution after liquefaction is stirred for 1 minute by a homogenizing mixer at 3000-12000 rpm to form the emulsion.

In one embodiment of the invention, the initiator at Step 3 is benzoyl peroxide (BPO), or 2,2-azobisisobutyronitrile (AIBN).

In one embodiment of the invention, at Step 3 the amount of the initiator based on the polymer monomer is 0.5-5 wt %.

In one embodiment of the invention, the cross-linking agent at Step 3 is selected from one of ethylene glycol dimethacrylate (EGDMA), 1,4-butanediol diacrylate, triallyl isocyanurate, butyl acrylate, 2-hydroxyethyl acrylate, hydroxypropyl acrylate, 2-hydroxyethyl methacrylate, and hydrolyzed polymaleic anhydride.

In one embodiment of the invention, the amount of the cross-linking agent based on the polymer monomer is between 5 wt % to 30 wt %, and preferably 20 wt %.

In one embodiment of the invention, at Step 3 the emulsion is stirred by a homogenizing mixer for 3 minutes by a homogenizing mixer at 3000~12000 rpm for micro-emulsion, and followed by subject to polymerization at 60-90° C. in water bath for four hours to obtain an aqueous solution of phase change material microcapsules.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended tables.

Figure 1:
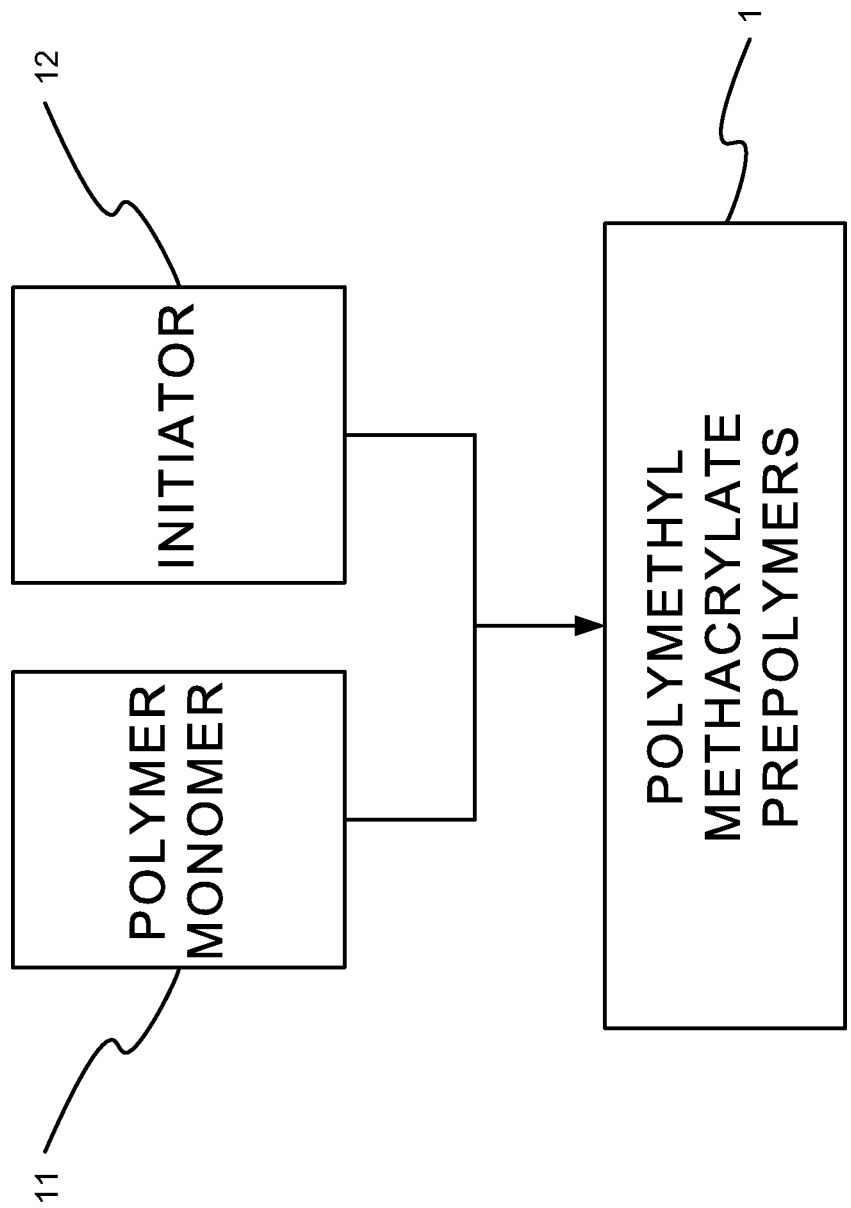
FIG. 1 is a schematic view of implementation of Step 1 of preparation of phase change material microcapsules by using a PMMA pre-polymer and an organic-solvent free process according to one embodiment of the invention.
Figure 2:
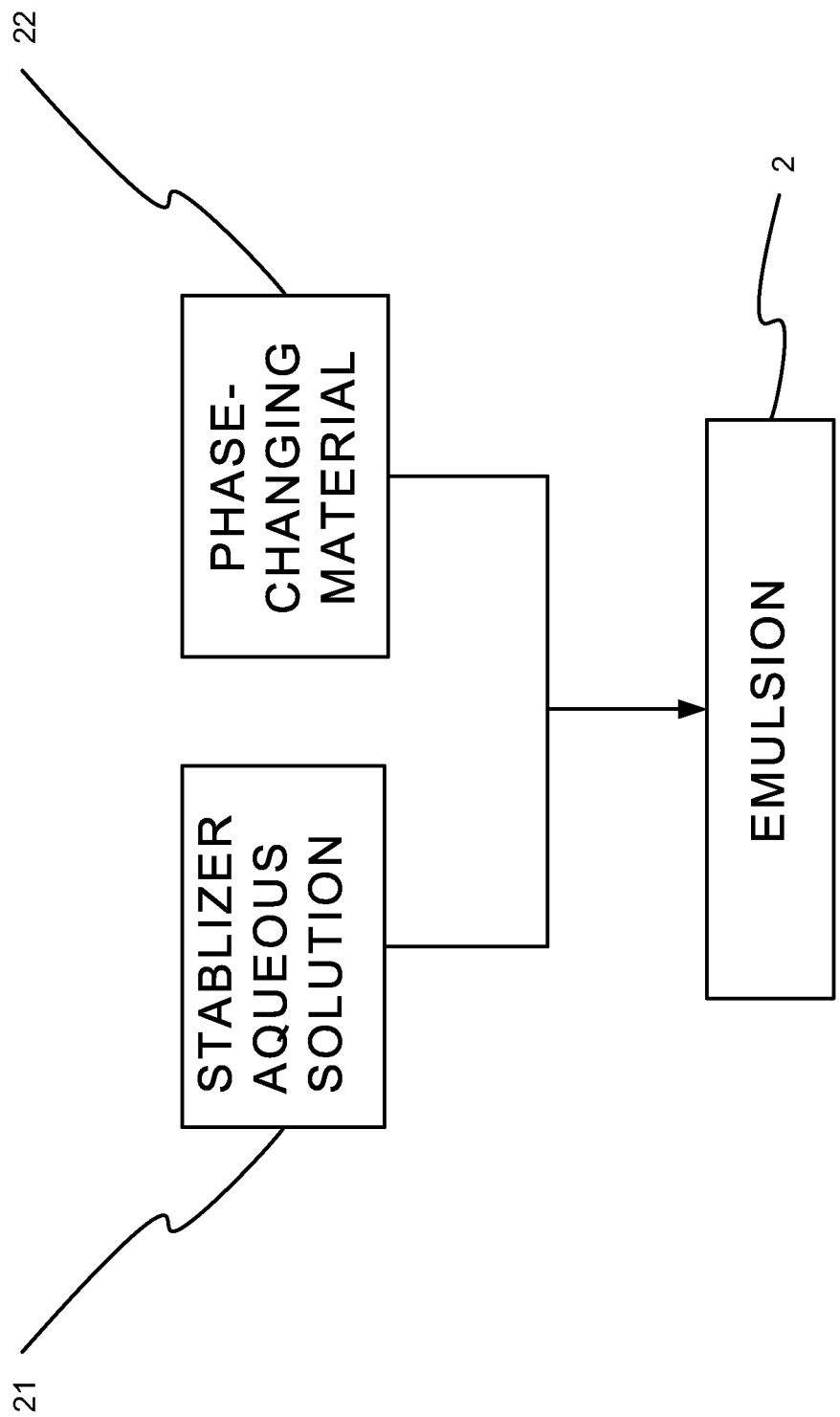
FIG. 2 is a schematic view of implementation of Step 2 of preparation of phase change material microcapsules by using a PMMA pre-polymer and an organic-solvent free process according to one embodiment of the invention.
Figure 3:
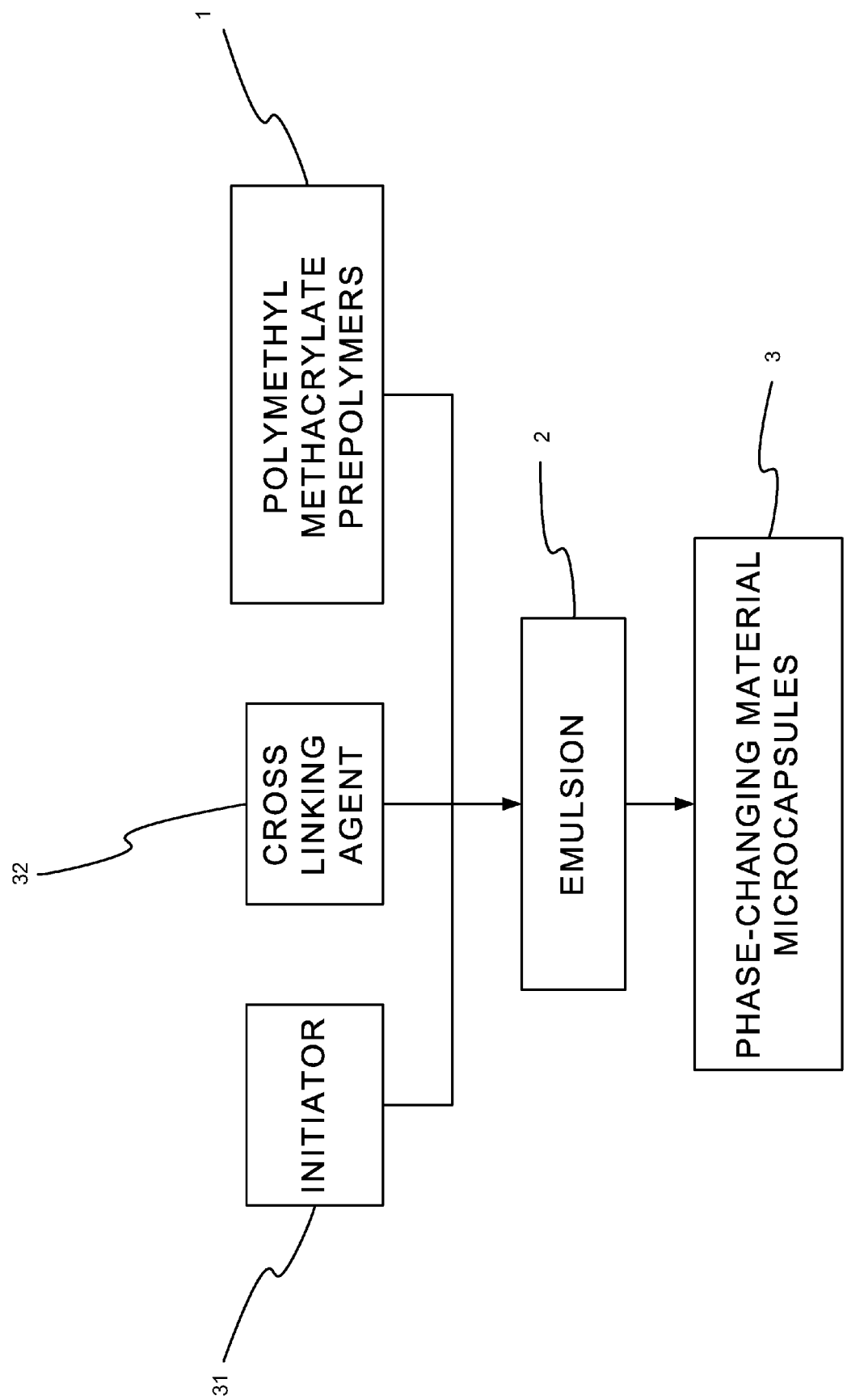
FIG. 3 is a schematic view of implementation of Step 3 of preparation of phase change material microcapsules by using a PMMA pre-polymer and an organic-solvent free process according to one embodiment of the invention.

FIGS. 1, 2 and 3 are respectively schematic views of implementation of Step 1, Step 2 and Step 3 of the present invention. As shown, the phase change material microcapsules synthesized by using a PMMA pre-polymer and an organic-solvent free process are prepared by at least the following steps:

Step 1: A polymer monomer 11 and an initiator 12 are subject to pre-polymerization in water bath so as to form Polymethyl methacrylate (PMMA) prepolymers 1. The conditions of preparing Polymethyl methacrylate prepolymer 1 include 5 minutes to 90 minutes in an organic-solvent free environment of 60° C. to 90° C. The preferred temperature for pre-polymerization is 80° C. and preferred time period for pre-polymerization is 20 minutes to 50 minutes. The polymer monomer 11 is methyl methacrylate (MMA). The initiator 12 is can be, for example, benzoyl peroxide (BPO), or 2,2-azobisisobutyronitrile (AIBN). The amount of the initiator 12 based on the polymer monomer 11 is 0.1 wt %.

Step 2: A stablizer aqueous solution 21 is prepared. A phase change material 22 is added to stabilizer aqueous solution 21 for liquefaction in advance, and then stirred for 1 minute by a homogenizing mixer at 3000-12000 rpm to form an emulsion 2. The concentration of the stabilizer in water is between 0.01 to 1%, preferably 0.1%. The stabilizer can be, for example, selected from one of polyvinyl alcohol (PVA), polyvinyl pyrrolidone (PVP), polyethylene glycol (PEG), and surfactants such as TWEEN or SPAN. The phase change material 22 can be organic paraffin having 14~44 carbons.

Step 3: An initiator 31, a crosslinking agent 32 and the Polymethyl methacrylate prepolymer 1 are added to the emulsion 2 containing phase change material 22. The emulsion 2 is further stirred for 3 minutes by a homogenizing mixer at 3000~12000 rpm for micro-emulsion, followed by polymerization in water bath at 80° C. for four hours. Thereby, phase change material microcapsules 3 are obtained. The amount of the initiator 31 based on the polymer monomer 11 is 0.5-5 wt %. The amount of the cross-linking agent 32 based on the polymer monomer 11 is between 5 wt % to 30 wt %, preferably 20 wt %. The initiator 31 can be, for example, benzoyl peroxide (BPO), or 2,2-azobisisobutyronitrile (AIBN). The cross-linking agent 32 can be, for example, selected from one of ethylene glycol dimethacrylate (EGDMA), 1,4-butanediol diacrylate, triallyl isocyanurate, butyl acrylate, 2-hydroxyethyl acrylate, hydroxypropyl acrylate, 2-hydroxyethyl methacrylate, and hydrolyzed polymaleic anhydride.

When the present invention is put into practice according to the above Steps, the polymer monomer 11 and 3 mg of the initiator 12 are prepolymerized at 80° C. for 30 minutes to form a methyl methacrylate prepolymer compound 1. A stabilizer aqueous solution 21 having concentration of 0.1% is prepared. 3 g of phase change material 22 is added to the stabilizer aqueous solution 21 for liquefaction in advance and then stirred by a homogenizing mixer at 11000 rpm for 1 minute. Then, 42 mg of the initiator 31, 0.6 ml of the cross-linking agent 32 and the Polymethyl methacrylate prepolymer 1 are added to the emulsion 2 containing the phase change material 22. The emulsion is then stirred by a homogenizing mixer at 7000 rpm for 3 minutes, followed by subject to polymerization at 80° C. in water bath for four hours. Thereby, an aqueous solution of phase change materials microcapsules 3 having particle size of about 2~22 μm and approximately 84% of nuclear content is obtain ned. This aqueous solution can be used directly, or after being made into powder by filtration, washing or drying.

In summary, the phase change material microcapsules synthesized by using PMMA prepolymer and organic-solvent free process according to the present invention effectively improve the shortcomings of conventional art. This invention uses the organic-solvent free process which enables the pre-polymerization of the polymer monomer to forms Polymethyl methacrylate prepolymer and further the encapsulation and polymerization at an oil-water interface, which achieves the formation of the phase change material microcapsules.

Therefore, the present invention can be more progressive, more practical, more in line with the consumer's need, and indeed in line with the elements of invention patent applications.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A method of synthesizing phase change material microcapsules using polymethyl methacrylate (PMMA) pre-polymer, the method comprising:
    pre-polymerizing a polymer monomer and a first initiator of benzoyl peroxide (BPO) in an organic-solvent free water bath so as to form PMMA prepolymers;
    preparing a stabilizer aqueous solution;
    adding a phase change material to the stabilizer aqueous solution for liquefaction; and
    adding a second initiator, a cross-linking agent and the polymethyl methacrylate prepolymer are added to the emulsion containing the phase change material, and the emulsion is further stirred for 3 minutes by a homogenizing mixer for micro-emulsion and followed by subject to polymerization in a water bath to produce phase change material microcapsules,
    wherein the cross-linking agent is selected from one of 1,4-butanediol diacrylate, triallyl isocyanurate, butyl acrylate, 2-hydroxyethyl acrylate, hydroxygropvl acrylate, 2-hydroxyethyl methacrylate, and hydrolyzed golymaleic anhydride.

2. The method of claim 1, wherein the polymer monomer is methyl methacrylate (MMA).

3. The method of claim 1, wherein the amount of the first initiator based on the polymer monomer is 0.1 wt. %.

4. The method of claim 1, comprising preparing the polymethyl methacrylate prepolymer at 60° C. to 90° C.

5. The method of claim 1, comprising preparing the polymethyl methacrylate prepolymer for 5 minutes to 90 minutes.

6. The method of claim 1, wherein the concentration of the stabilizer in water is between 0.01 to 1%.

7. The method of claim 1, wherein the stabilizer is selected from one of polyvinyl pyrrolidone (PVP), polyethylene glycol (PEG), TWEEN, and SPAN.

8. The method of claim 1, wherein the phase change material is organic paraffin having 14-44 carbons.

9. The method of claim 1, comprising stirring the stabilizer aqueous solution after liquefaction for 1 minute by a homogenizing mixer at 3000-12000 r.p.m. to form the emulsion.

10. The method of claim 1, wherein the second initiator is benzoyl peroxide (BPO), or 2,2-azobisisobutyronitrile (AIBN).

11. The method of claim 1, wherein the amount of the second initiator based on the polymer monomer is 0.5-5 wt. %.

12. The method of claim 1, wherein the amount of the cross-linking agent based on the polymer monomer is between 5 wt. % to 30 wt. %.

13. The method of claim 1, further comprising stirring the emulsion for 3 minutes by a homogenizing mixer at 3000-12000 r.p.m. for micro-emulsion.

14. The method of claim 1, wherein the temperature for the polymerization in water bath is carried out at 60° C. to 90° C.

15. The method of claim 1, wherein the phase change material microcapsules produced have a particle size of 2 to 22 micrometers.

* * * * *